United States Patent [19]
Eden

[11] Patent Number: 5,042,779
[45] Date of Patent: Aug. 27, 1991

[54] VEHICLE LEVELER AND SUPPORT

[76] Inventor: Wallace R. Eden, 73 Mariner La. N., Fox Lake, Ill. 60020

[21] Appl. No.: 519,888

[22] Filed: May 7, 1990

[51] Int. Cl.[5] .............................................. B60S 9/02
[52] U.S. Cl. .................................................. 254/424
[58] Field of Search .............. 254/126, 424, 425, 419, 254/DIG. 1, DIG. 4, 101

[56] References Cited

U.S. PATENT DOCUMENTS

| | | | |
|---|---|---|---|
| 3,565,396 | 2/1971 | Spear | 254/424 |
| 3,667,730 | 6/1972 | Kollmar | 254/424 |
| 4,289,300 | 9/1981 | Weisser et al. | 254/126 |

FOREIGN PATENT DOCUMENTS

| | | | |
|---|---|---|---|
| 828047 | 1/1952 | Fed. Rep. of Germany | 254/424 |
| 2436893 | 2/1976 | Fed. Rep. of Germany | 254/424 |

*Primary Examiner*—Robert C. Watson
*Attorney, Agent, or Firm*—Dvorak and Traub

[57] ABSTRACT

A leveler and support device for use with vehicles such as motor homes, trailers, recreational vans, automobiles, trucks, and other motorized vehicles. The device is attached to a vehicle, and comprises a support means, a support arm, a foot pad, and a lifting means. In use, the support arm is swung down from the support means, and a lifting means is provided between the support means and the support arm, whereby upon rotation of the lifting means, the support means and the support arm are caused to spread apart so as to lift the vehicle.

1 Claim, 1 Drawing Sheet

VEHICLE LEVELER AND SUPPORT

BACKGROUND OF THE INVENTION

This invention relates generally to the levelling and stabilizing of vehicles, particularly to the levelling of campers, trailers, and any other vehicles that require a level position to permit proper functioning when at the rest condition.

Various means have been utilized to solve the problem of levelling and supporting a vehicle while at rest. One such means involves temporarily attaching a stand alone jack device to the vehicle, and operating the jack to raise the vehicle so that more permanent support means, such as masonry, wood, or jack stands may be placed underneath the vehicle. This method has several drawbacks, inasmuch as it does not facilitate achieving a level position for the vehicle because the rest position is slightly different than the jacked position. Also, positioning and removing the jack creates a safety hazard for the operator, and the fact that the jack means and the support means are separate from the vehicle creates an inconvenience.

Another means, disclosed in U.S. Pat. No. 4,103,869, involves an electrically connected plurality of motor-driven mechanisms which act to stabilize the corners of a vehicle, but this structure does not provide for a simple and inexpensive structure for levelling and supporting a vehicle.

The present invention satisfies the need for a device which is easily attachable to virtually any vehicle, is simple in design and low in cost, and which facilitates the safe and quick levelling and support of such vehicle.

SUMMARY OF THE INVENTION

The purpose of this invention is to provide a simple, affordable, quick, and safe means for levelling and supporting a vehicle.

The device comprises a support means, a support arm, and a lifting screw/running nut arrangement which spreads the support means and support arms apart from each other. Since the device is attached to the vehicle, it permits lifting of the vehicle with respect to the ground. The device is foldable to a compact and convenient form for storage with respect to the vehicle.

A normal ratchet wrench is the only tool required to operate the device. Because of the location of the device on the vehicle, the levelling and support functions may be carried out by an operator while in the standing position. This eliminates the dangers associated with reaching under the vehicle during the raising or lowering activities. Also, the standing position of the operator allows for more comfortable operation of the device.

The invention is primarily intended for levelling and supporting a vehicle, in which case a plurality of the devices would be positioned around the vehicle so as to allow for independent adjustment of each side or each corner.

One object of the invention is to provide a means for levelling and supporting a vehicle which is adaptable for use on virtually any type of vehicle.

Another object of the invention is to provide a simple, affordable, and safe means for levelling and supporting a vehicle.

Another object of the invention is to provide a means for levelling and supporting a vehicle which is attachable to the vehicle and is virtually unaffected by exposure to the elements.

Another object of the invention is to provide a means for levelling and supporting a vehicle which is foldable to a compact and convenient form for storage.

Still another object of the invention is to provide a means for levelling and supporting a vehicle which allows the operator to remain in an upright position while raising and/or lowering the vehicle.

Other advantages of the invention will become apparent from the following detailed description of the invention.

DETAILED DESCRIPTION OF THE PREFERRED EMBODIMENT

Figure 1:
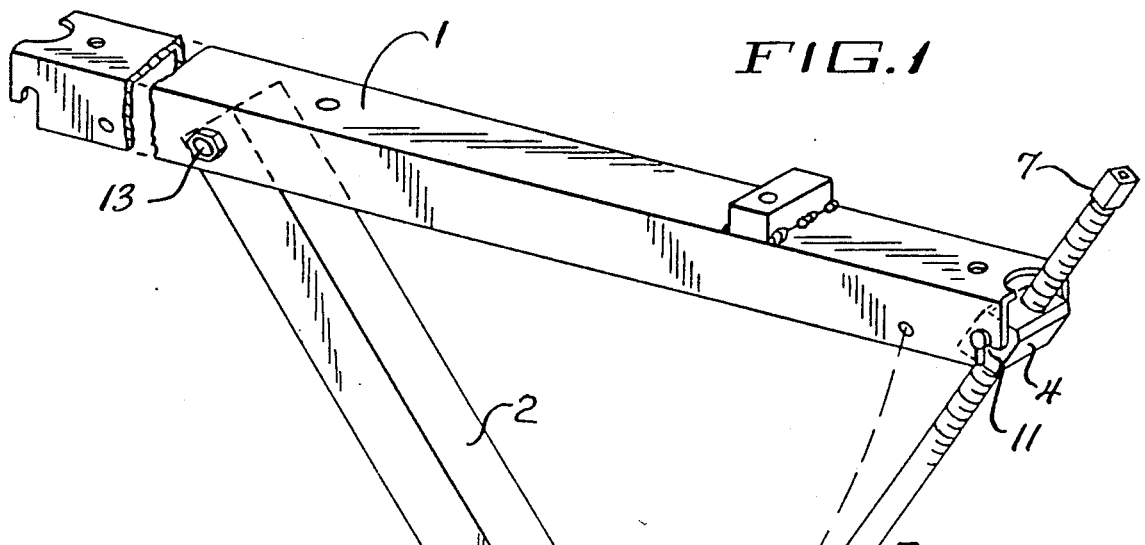
FIG. 1 is a perspective view of the leveler and support device as it would be installed on a vehicle.

The assembled lever and support device as it would appear in use is illustrated in FIG. 1. The support means 1 is attachable to the underside of a vehicle. The support arm 2 is hinged by pivot means 13 at one end to the support means 1, and at the other end to a foot pad 3. The lifting screw/running nut assembly 5, 4 is positioned between the support arm 2 and the support means 1 such that one end of the lifting screw 5 engages the support arm 2, and ears 6 on the running nut 4 engage the support means 1. The lifting screw 5 and the running nut 4 are threaded such that upon rotation of the lifting screw 5, the running nut 4 moves relative to the screw 5.

Figure 2:
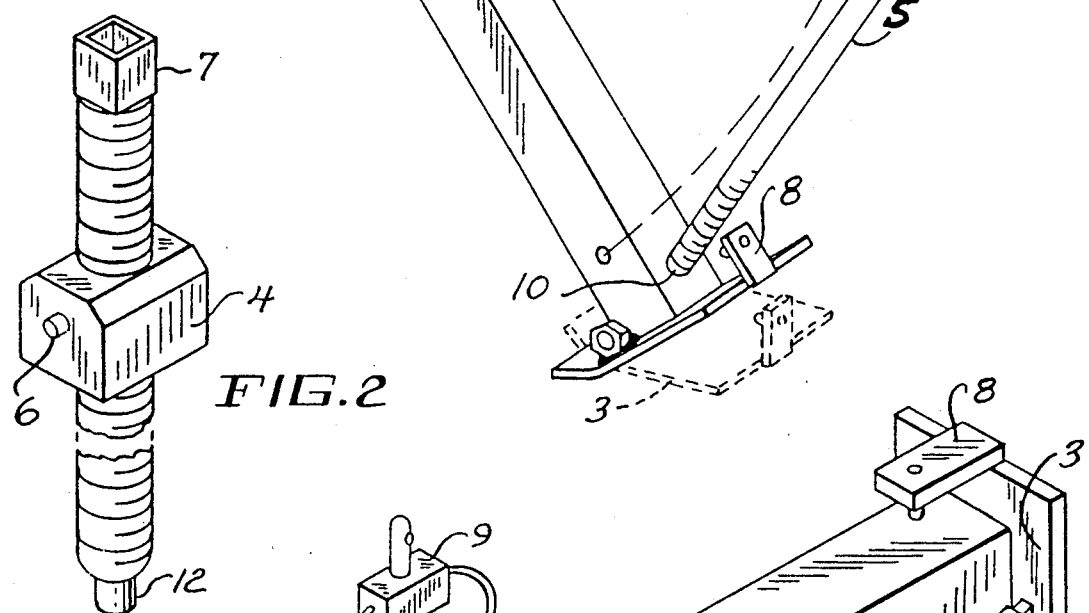
FIG. 2 is a perspective view of the lifting screw and running nut.
Figure 5:
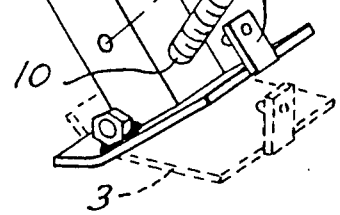
FIG. 5 is a perspective view of the lock pin.
Figure 3:
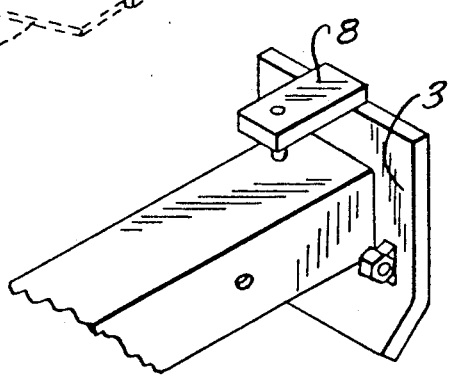
FIG. 3 is a perspective view of the foot pad and retainer.

In one embodiment as shown in FIG. 2, for purposes of turning the lifting screw 5, the turning end 7 of the lifting screw 5 opposite the support arm 2 is shaped to accommodate a ratchet wrench, and the opposite, support end 12, is standard shaped to engage an aperture 10 in the support arm 2.

The motion of the running nut 4 along the lifting screw 5, in the direction away from the support arm 2, spreads the support arm 2 away from the support means 1, until the foot pad 3 touches the ground. Further rotation of the lifting screw 5 causes further spreading of the support arm 2 and support means 1, which results in upward movement of the vehicle at that point.

By attaching the devices at strategic locations along the vehicle underside, it becomes a simple matter to alternately raise and lower different points of the vehicle until it is completely level. Because of the convenient location of the device, it may be actuated by an operator while the operator remains in a generally upright position, safely away from the underside of the vehicle.

Figure 4:
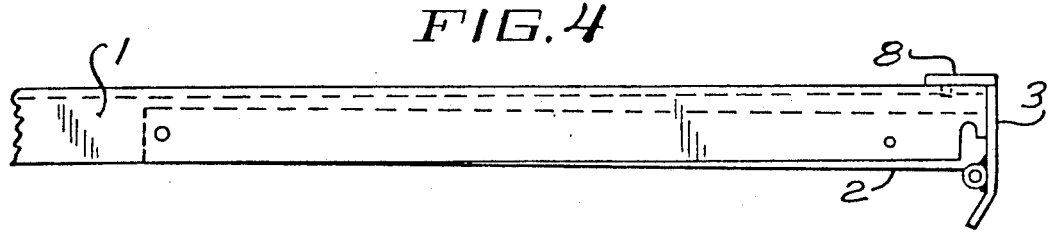
FIG. 4 is a side view of the leveler and support device in the storage position.

In storage as shown in FIG. 4, the support arm 2 and foot pad 3 are pivoted upwardly to fit inside the support means 1. A retainer 8 is positioned so as to hold the support arm 2 in the storage position. A lock pin 9 is used to further secure the support arm 2 in the storage position. The running nut 4 and lifting screw 5 are conveniently stored inside the vehicle, thereby protecting the threaded surfaces from the effects of exposure to the elements.

When in the storage position, the device forms an extremely compact and secure arrangement. The underside of the vehicle remains unencumbered by the folded structure, thereby providing an aesthetically pleasing appearance, and also a safe condition for those times when the vehicle is moving.

In use, the lock pin 4 is removed, and the foot pad 3 is pivoted so as to release the support arm 2 from the storage position. The support arm 2 is allowed to pivot down until the foot pad 3 contacts the ground surface. At that time, the lifting screw/running nut structure 5, 4 is positioned such that one end of the lifting screw 5 engages an aperture 10 in the support arm 2, and the other end of the lifting screw 5 is exposed for engagement with a conventional ratchet wrench tool. The running nut 4 is positioned along the lifting screw 5 so that ears 6 on the running nut 4 engage receiving areas 11 on the support means 1. An operator is now able to use a ratchet wrench or similar tool to rotate the lifting screw 5, so as to increase the angle opposite the lifting screw 5 which is formed by the support arm 2 and the support means 1. As this angle increases, the support means 1 is forced upward, thereby lifting the vehicle at that point. It can be seen that by strategic placement of one or more of the devices, a vehicle may be raised, leveled, and supported in a simple and convenient manner. The triangle formed by the three main elements, the support arm 2, the support means 1, and the lifting screw 5, results in an extremely rigid and stable structure for supporting the vehicle.

The device provides a simple, economical, safe, and convenient solution to the problem of vehicle raising, levelling, and support.

Many variations of the present invention are possible in view of the above-mentioned teachings. The scope of the invention is, therefore, not limited by the details disclosed herein.

I claim:

1. A leveler and support device for vehicles and objects, comprising: a downwardly projecting substantially U-shaped channel support means disposed on an underside of the vehicle, said support means having running nut receiving means, a first support arm pivotally connected to and disposed at a first end of said support means, a second support arm pivotally connected to and disposed at a second end of said support means, said first and second support arms each having a lifting screw aperture, said support means arranged and constructed to receive and store said first and said second support arms when in a non-extended position, a pivotable foot pad disposed at a distal end of each of said support arms, an integrated retainer means disposed on said foot pad, said retainer means being engageable with said support means for securing said support arm in the non-extended position, a non-permanently attached, removable threaded lifting screw with one end being adapted to non-slidably engage said lifting screw aperture and an opposite end having engagement means shaped to receive a standard hand tool wrench driver, a running nut threadedly engaged on said lifting screw and being engageable with said support means, a pair of outwardly extending ears disposed on said running nut, said ears engageable with said running nut receiving means, and a removable lock pin arranged and constructed to pass through a transverse aperture in said support means and support arm when in the non-extended position, said support arms being arranged and constructed to free fall from a non-extended, up position substantially inside said support means, to the ground, in order to accept the separately-stored lifting screw/running nut arrangement, whereby said lifting screw/running nut arrangement, engaged with said support arm and said support means, respectively, such that, upon rotation of said lifting screw, said leveler and support device changes the vertical position of the object to be levelled.

* * * * *